Patented Oct. 23, 1934

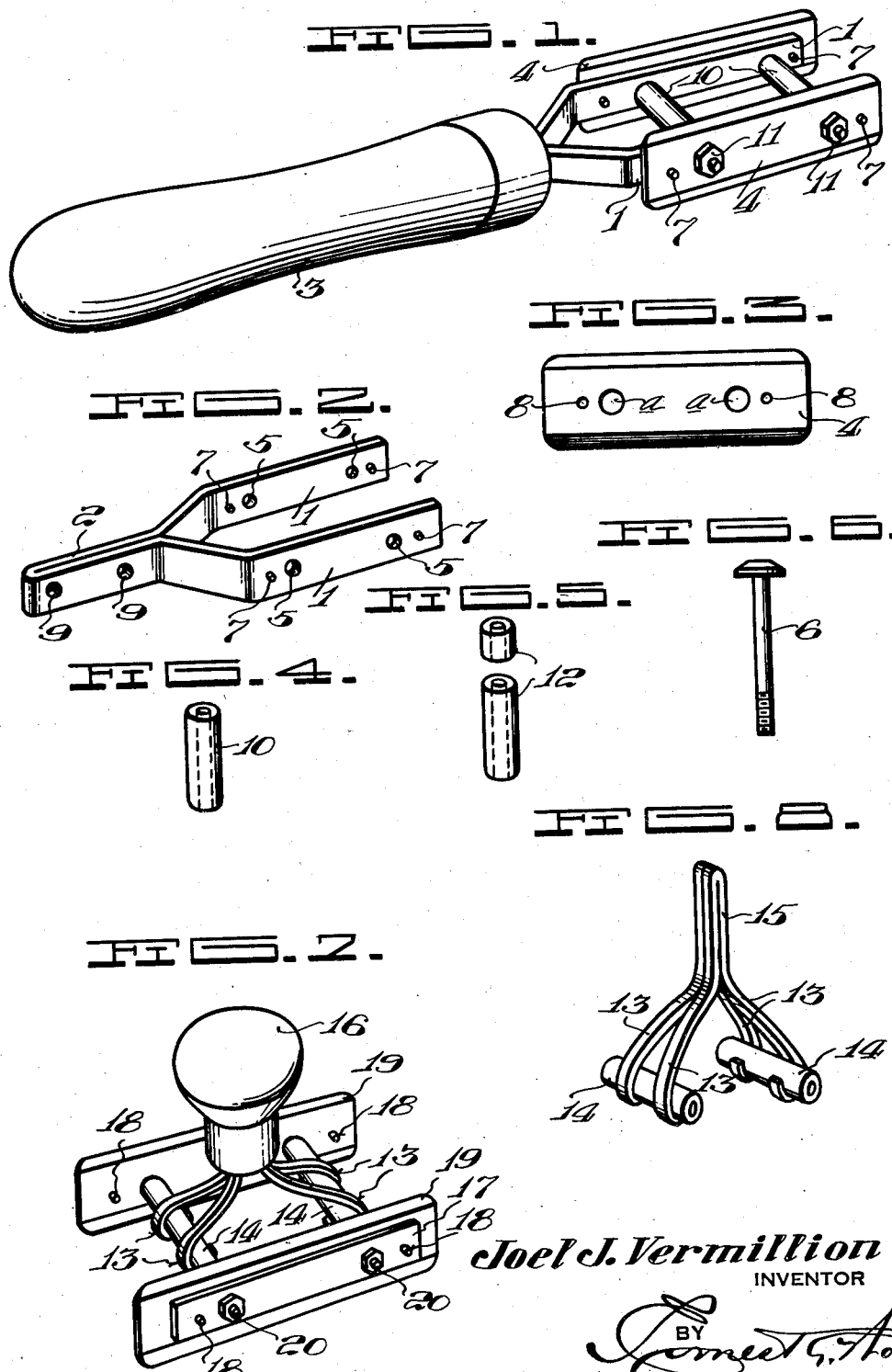

1,977,902

UNITED STATES PATENT OFFICE 1,977,902

BUDDING KNIFE

Joel J. Vermillion, Nevada, Tex.

Application August 31, 1933, Serial No. 687,623

2 Claims. (Cl. 47—7)

This invention relates to instruments used in the practice of horticulture and tree surgery and it has particular reference to budding knives.

The principal object of the invention is to provide a budding knife, simple of construction which will promote speed in the operation of transferring buds from one plant to another and to enable the operator to have a better view of the work being performed thus insuring a more satisfactory operation without the necessity of exercising the extreme care required through the use of old methods.

Another object of the invention is to provide a budding knife whose parts are interchangeable and may be arranged so as to cut buds of different lengths. Moreover, the invention seeks to provide a knife of the character specified which may be easily taken apart when not in use thus protecting the same against abuse as well as preventing injury to persons when the knife is carelessly handled.

With the foregoing objects as paramount, the invention has particular reference to its salient features of construction and arrangement of parts, which will become manifest as the description proceeds, taken in connection with the accompanying drawing, in which:

Figure 1 is a perspective view of the preferred form of the invention showing the parts assembled.

Figure 2 is a detail view of the knife frame shown in Figure 1.

Figure 3 is a detail view of the preferred form of cutting blade.

Figure 4 is a detail view of one of the spacing ferrules.

Figure 5 is a modified form of spacing ferrule in sections for adjusting the spacing of the blades.

Figure 6 is a detail view of one of the retaining pins.

Figure 7 is a perspective view of a modified form of the budding knife, and

Figure 8 is a detail view in perspective, illustrating the frame of the knife shown in Figure 7.

It is very important, in the operation of grafting that the sections of bark removed from the trees or bushes be so cut as to fit precisely in the space from which another section is removed and it is preferred that the cells of the bud cion correspond to those of the stock for better results and to insure sufficient healing of the incision. Thus the invention seeks to provide a frame structure which is entirely open to the view of the operator and constructed to use substantially thin blades yet having the required strength and durability and capable of retaining a comparatively sharp cutting edge.

Continuing with a more detailed description of the drawing, the preferred form of the invention is constructed by shaping a strip of metal into the form shown in Figures 1 and 2 to define arms 1 and a tail portion 2 for the reception of a handle 3. The arms 1 are parallel but due to the yieldability of the material of which the member is constructed, the arms 1 are capable of movement toward and away from each other in the operation of adjusting the spacing of the blades 4, to which reference will be later made.

The arms 1 are provided with apertures 5 to receive bolts or threaded pins 6, one of which is shown in detail in Figure 6. Small pins or protuberances 7 are likewise provided on the arms 1 which enter corresponding apertures 8 in the blades 4, to thus hold the blades rigid with respect to the frame. The blades are further provided with larger apertures *a* to receive the pin 6. The tail portion 2 of the frame is provided with apertures 9 by which the frame is securely held in the handle 3 by passing suitable pins through the handle and the apertures 9.

In assembling the structure shown in Figures 1 to 6 inclusive, the ferrule 10 shown in Figure 4 is held in position between the arms 1 of the frame while the blades 4 are disposed either on the inside or the outside of the arms 1. The pin or bolt 6 is passed through the blades, arms and ferrule and a nut 11 is screwed onto its threaded end. The tool is thus prepared for use.

When it is desired to increase or decrease the space between the blades 4, the type of ferrule 12 shown in Figure 5 is employed which is nothing more than the ferrule shown in Figure 4 made in sections. It is simply necessary to add or remove one or more sections in the operation of spacing the blades 4.

Figures 7 and 8 illustrate a modified form of budding knife. The frame of this knife is comprised of strips of material so cut and shaped as to define prongs 13 which are bent to embrace ferrules 14 and a tail portion 15 adapted to enter and be secured in a handle 16. The blade retaining structure is not unlike the structure shown in Figures 1 and 2 and is comprised of plates or strips 17 having small projections or pins 18 adjacent either end thereof for reception by corresponding apertures in the blades 19. As in the previous case, the blades 19 may be disposed either on the inside or outside of the plates 17 and in either case held by bolts 20.

It will be noted that aside from the frame structures, all of the parts of the knife shown in Figures 7 and 8 are interchangeable with those of the knife shown in Figures 1 and 2. If only a slight degree of change in spacing is desired, the blades in either case may be disposed on the inside of the frame as shown in Figure 7 and to increase the space between the blades, they may be disposed on the outside of the frame as shown in Figure 1.

The blades 4 and 19 are constructed preferably of high grade steel so that the desired thickness may be obtained yet having sufficient strength to withstand the abuse to which they may be subjected under normal conditions. These blades are not unlike certain types of razor blades and in fact, these razor blades may be employed with but slight alterations, if any.

Manifestly, the construction shown is capable of some modification and such modification as is considered within the scope and meaning of the appended claims is also considered within the spirit and intent of the invention.

What is claimed is:

1. A budding knife including a handle and a frame, said frame comprising members disposed in parallel, fixed relationship with said handle and capable of relative displacement and having spaced apertures therein, projections carried by said members adjacent to either end thereof and projecting inwardly and outwardly from the sides thereof, blades having apertures corresponding to the apertures of said members and adapted to lie flush against said parallel members to receive the projections carried by said members and whereby their cutting edges will be parallel with said frame members and means disposed between said members for maintaining spaced relationship thereof.

2. A budding knife including a handle and a frame comprising a pair of members disposed in parallel, fixed relationship with said handle and having spaced apertures therein, the apertures in one member corresponding to those of the companion member whereby to receive pins, blades having double cutting edges interchangeably arranged for disposition against said frame members and having apertures therein, projections carried by said frame members to be received by the apertures of said blades for maintaining rigidity of the latter with respect to said frame members and ferrules mounted on said pins and lying between said frame members to hold the same in spaced relationship.

JOEL J. VERMILLION.